United States Patent
Mueller

[15] 3,658,152
[45] Apr. 25, 1972

[54] TIRE BEAD LUBRICATOR
[72] Inventor: John L. Mueller, Detroit, Mich.
[73] Assignee: Sparton Corporation, Jackson, Mich.
[22] Filed: Jan. 11, 1971
[21] Appl. No.: 105,559

[52] U.S. Cl. ..................184/1 R, 118/233, 118/241, 184/101
[51] Int. Cl. ..........................F16n 1/00, B05c 5/02
[58] Field of Search...............184/1 R, 17, 101; 118/233, 118/241, 254, 246

[56] References Cited
UNITED STATES PATENTS

| | | | |
|---|---|---|---|
| 1,218,155 | 3/1917 | Zimmerman | 118/241 X |
| 2,690,207 | 9/1954 | Godfrey, Jr. | 118/241 X |
| 2,805,699 | 9/1957 | Reading | 118/241 X |

Primary Examiner—Manuel A. Antonakas
Attorney—Beaman & Beaman

[57] ABSTRACT

Apparatus for automatically applying a lubricating liquid to the beads of an unmounted pneumatic tire prior to the mounting of the tire upon a wheel. The apparatus includes a rotating roller having a periphery coated with the lubricating liquid which is axially inserted through the tire opening and raised to support the tire upon the roller by its beads wherein rotation of the roller applies the lubricating liquid to the tire beads. The apparatus is automatically operated, and preferably, forms a part of an automated wheel assembly system. Axial and vertical movement of the roller is accomplished by a roller supporting linkage system.

13 Claims, 6 Drawing Figures

INVENTOR
JOHN L. MUELLER
BY Beaman & Beaman
ATTORNEYS

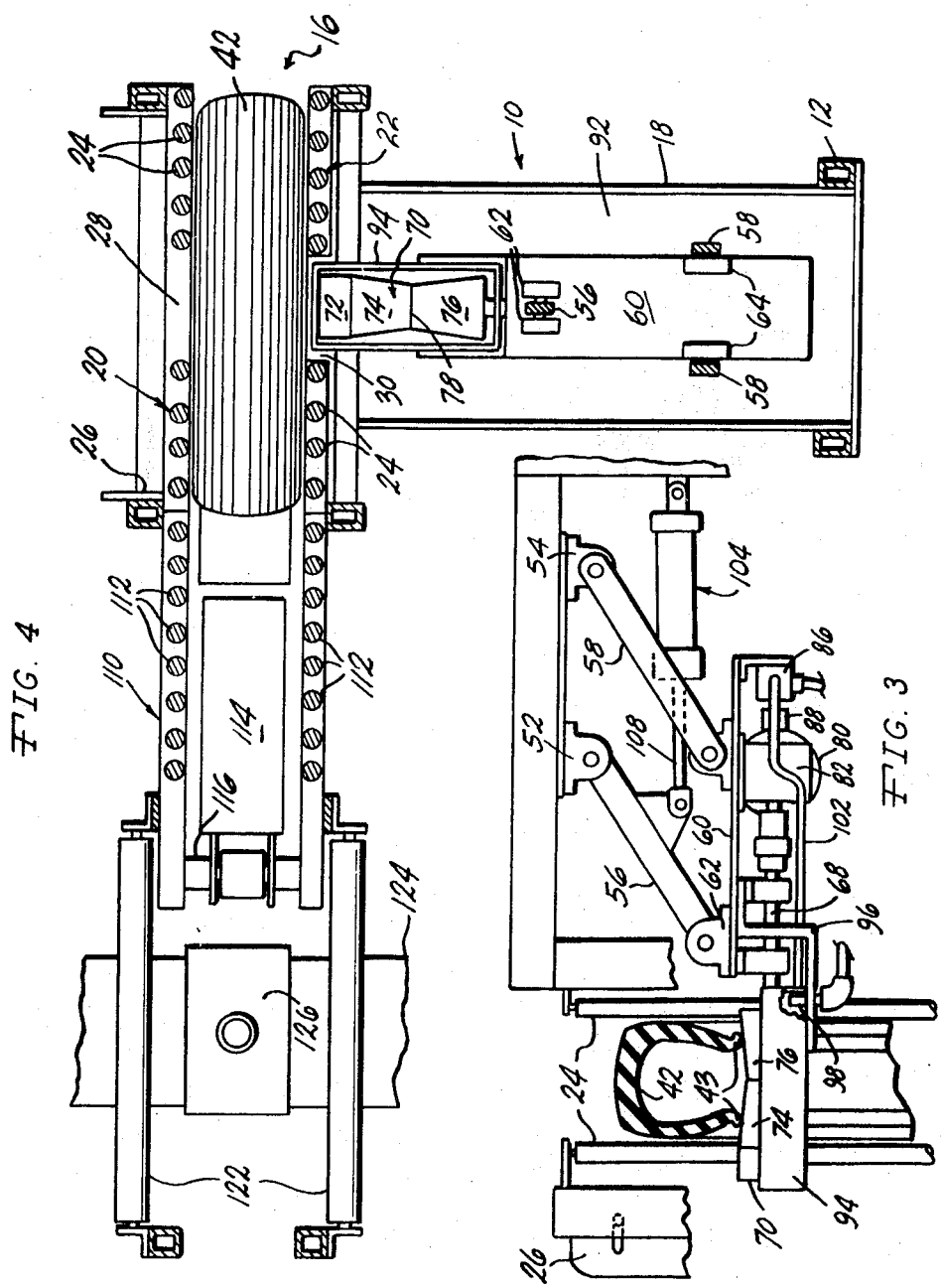

INVENTOR
JOHN L. MUELLER
BY Beaman & Beaman
ATTORNEYS

TIRE BEAD LUBRICATOR

BACKGROUND OF THE INVENTION

The invention pertains to apparatus for applying a lubricating liquid to the beads of unmounted pneumatic tires by a roll coating process.

In the mounting of pneumatic tires upon wheels the tire bead is forced over the wheel rims, and as the wheel rim is of such a size as to "spread" the bead as it is forced thereover, considerable abrasion occurs between the rim and the tire bead during mounting. This close engagement between the rim and the bead is necessitated by the dimensional relationship of the rim and tire bead which, once the tire is mounted, must cooperate to form a complete and sealing relationship as is necessary with tubeless tires.

The forcing of the tire beads over the wheel rim can damage the tire bead and adversely affect the sealing thereof with the wheel rim once mounting has been completed. In order to prevent such dilatorious abrasion it is common practice to apply a lubricating liquid or soap to the tire bead to facilitate the movement thereof over the rim. Such applications of lubricating liquid are usually made by a brush or rag where a single tire and rim are being mounted, as takes place in a service station or the like.

Under high production conditions, such as those employed in the automotive industry, the mounting of pneumatic tires upon wheels is automated, and thus the lubrication of the tire beads must also be automated as such lubrication constitutes an important step in the mounting system. High production lubricators have usually previously taken the form of spraying devices for applying the lubricating liquid to the tire bead by an atomizing spray nozzle as the tire is rotated. As each tire includes two beads, the lubricating liquid must be sprayed on each bead and applied in such a manner as to completely cover those surfaces which are engaged by the wheel rim during mounting.

While only a limited portion of the tire bead is engaged by the wheel rim during mounting, the application of the lubricating liquid by spraying usually results in an excess of lubricating liquid being applied and the liquid often runs down the inside or outside of the tire, and much of the lubricating liquid is wasted.

Additionally, prior automated tire lubrication devices using a spraying application, or wiping action, do not apply the lubricating liquid to the tire beads with such force as to insure effective bead coverage and the means for handling the tire during liquid application have caused problems.

SUMMARY OF THE INVENTION

In the instant invention the application of a lubricating liquid, such as a soap, to a pneumatic tire bead is accomplished by a roll coating process wherein the tire is supported upon a roller by its beads, and the roller is thoroughly wetted with the lubricating liquid and transfers the liquid directly to the portions of the tire bead most requiring lubrication.

The tire, prior to lubrication, and during lubrication, is maintained in a vertical orientation, and the tire positioning means is free of any obstruction so as to easily receive the tire, and permit transfer movement therethrough once lubrication has taken place. The lubricant applying roller is mounted upon a parallelogram linkage such that the axis of the roller is substantially horizontally oriented, and remains so oriented during its operation. The weight of the tire establishes engagement of the tire bead upon the roller as the roller is inserted in the tire opening and then raised to a height such that the complete weight of the tire is supported by its beads upon the roller during lubrication.

The roller is partially immersed in a tray containing lubricating liquid soap and the upper portion of the roller extends above the tray for direct engagement with the tire beads. When the tire is raised by the roller the roller is rotated by a motor and the tire elevation and lubricant application occurs for a sufficient time to revolve the tire at least one complete revolution to thoroughly coat the beads with lubricant.

After the bead lubrication the roller is lowered and removed from the tire opening to clear the tire positioning area such that the lubricated tire may be readily ejected from the lubricator and transferred to a conveyor loader and conveying means for association with a wheel for subsequent mounting thereto.

The tire positioning means includes a plurality of vertical positioning rollers, a set of positioning rollers constituting opposite sides of the tire positioning means, whereby the rollers permit rotation of the tire while mounted upon the lubricating roller, but engage the sides of the tire to maintain the tire in a substantially vertical plane before, after and during lubrication. A supporting shoe is located at the bottom region of the tire positioner and is operated by an expansible motor for transferring the tire from the tire positioning means once lubrication is completed.

Orientation of the tire upon the lubricating roller during lubrication is facilitated by the formation of a pair of conical surfaced portions defined on the roller periphery which converge towards each other at the central region of the roller. Thus, as the tire is rotated during lubrication, the tire will tend to center itself upon the lubricating roller and a most effective application of the lubricating liquid may take place. The lubricating roller is preferably rotated by an air motor, which is also in a driving relationship with the lubricating liquid pump. The pump communicates with a reservoir, and a standpipe is located within the lubricating liquid tray such that the output of the pump supplies the tray and the standpipe permits a uniform lubricating liquid level within the tray at all times as long as the pump output is greater than the rate that the lubricating liquid is applied to the tires.

Automatic control means are employed in conjunction with the apparatus and limit switches, time delays and other electrical components are used to insure the proper sequence of operation.

The bead lubricator of the invention is positive in operation, relatively simplified in construction as to lower maintenance and manufacturing costs, and capable of lubricating tires at a high production rate.

BRIEF DESCRIPTION OF THE DRAWINGS

The aforementioned objects and operation of the invention will be appreciated from the following description and accompanying drawings wherein:

FIG. 3 is a detail view of the lubricating roller and associated components, illustrating the relationship thereof with the lubricating roller in the raised and operative condition, FIG. 4 is a plan sectional view taken along Section IV—IV of FIG. 2 and also illustrating loader and conveyor structure.

DESCRIPTION OF THE PREFERRED EMBODIMENT

Figure 1:
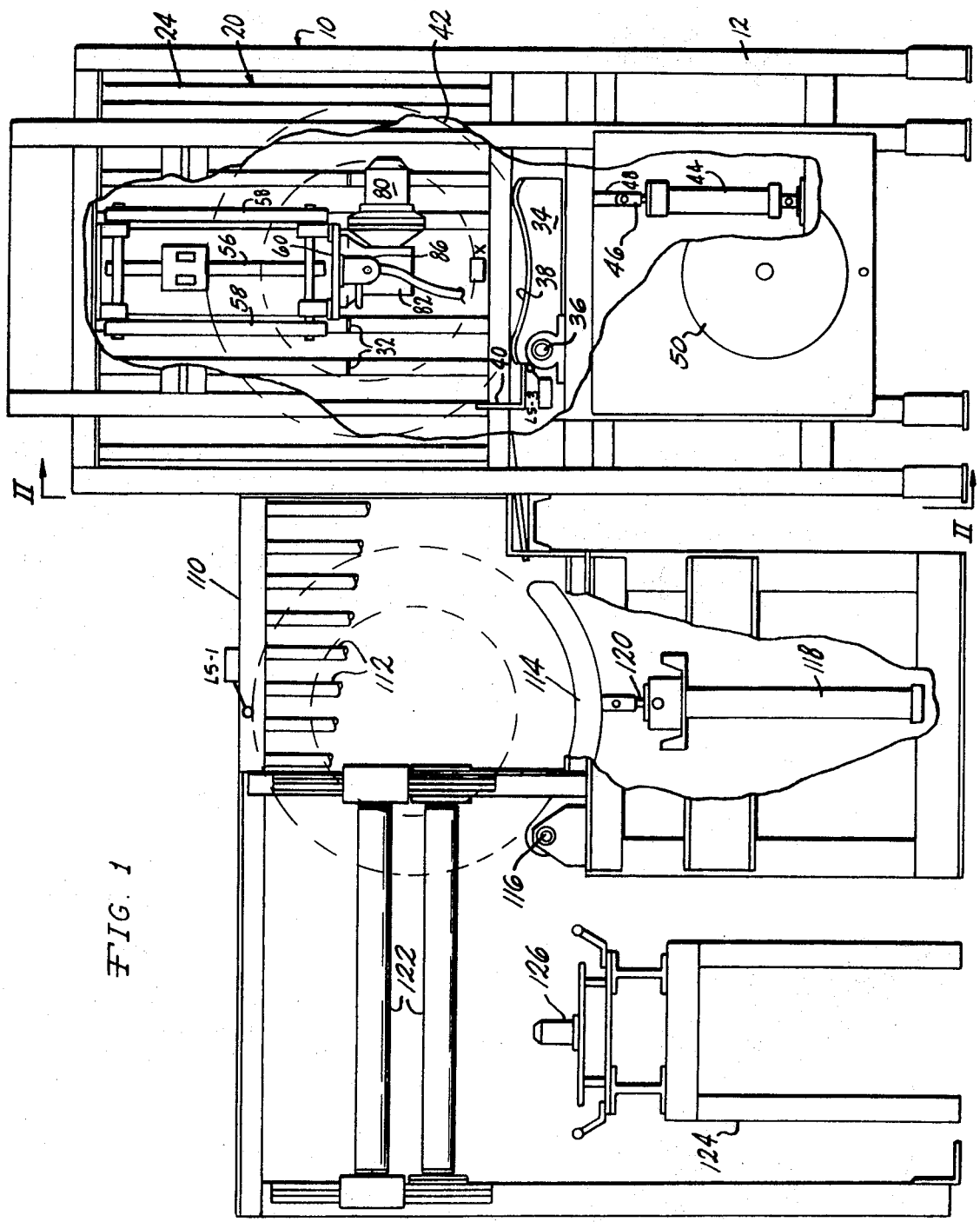
FIG. 1 is an elevational view, partially in section, illustrating tire bead lubrication apparatus in accord with the invention, and also illustrating portions of the associated conveyor and conveyor loader.

The general arrangement of the components of the invention are best appreciated from FIGS. 1 through 4. The lubricating apparatus includes a frame generally designated at 10 consisting of a plurality of columns 12 interconnected by cross members, and including upper horizontal cross beams 14, FIG. 2. The portion 16 of the frame constitutes a tire positioning or retaining portion, while the frame portion 18, FIG. 4, constitutes a cabinet in which the lubricating roller and associated components are housed, including the lubricating liquid soap reservoir tank, control valve solonoids, and the like.

The tire positioning portion 16 of the frame 10 may be considered to constitute a chute or guide defined on its lateral sides by sets of vertically disposed tire positioning rollers, the outer set being designated at 20, and the other inner set referred to by 22, FIG. 4. Each of the sets of rollers 24 capable of rotation about their vertical axes. The roller set 20 is preferably mounted upon an adjustment plate 26, FIG. 2, which is mounted upon the frame columns by a horizontal slot arrangement to permit adjustment of the entire roller set 20 toward and away from the roller set 22. In this manner the width of the tire positioning portion 16 can be adjusted to accommodate the various widths of tires to be lubricated. The rollers 24 of each set are so spaced at their central region to define clearance openings 28 and 30 which provides access for the lubricating roller and soap tray during operation. The two rollers 24 closest to the openings 28 and 30, of each set and on each side of the openings, are preferably formed with separate upper and lower portions capable of rotation in opposite directions since the upper portion of these rollers will engage the upper portion of the tire during its rotation, while the lower portion of the rollers will engage the lower portion of the tire, and thus the upper and lower portions of a common roller will be rotating in opposite directions. The separating line 32 for the upper and lower portions of these rollers will be appreciated from FIG. 1.

The tire is supported in the tire positioning means by an ejector shoe or support 34, FIG. 1, which is pivotally mounted upon the frame portion 16 for oscillation about the horizontal pivot pin 36. The ejector shoe 34 is formed with an upper concave surface 38 to receive and properly center the tire within the tire positioning means, and to insure initial reception of the tire on the shoe additional positioning means in the form of an arm 40 are mounted on the ejector shoe to aid in the tire positioning on the shoe.

The unmounted tire to be lubricated may be inserted into the tire positioning means portion 16 from the top, or could be introduced from the right side of the frame portion 10, FIG. 1. In the preferred embodiment of the invention the unmounted tire is introduced into the tire positioning means from the top and the tire 42 will be initially located as shown in light lines in FIG. 1.

The shoe 34 may be pivoted in a counterclockwise direction, FIG. 1, by an expansible chamber motor 44 pivotally mounted upon the frame portion 16. The chamber motor includes a piston 46 pivotally connected to the shoe extension 48 whereby extending of the piston will sufficiently raise the right portion of the shoe 34 to roll the tire to the left toward the loading and conveying apparatus, as will be later described. During such rotation of the shoe 34 the arm 40 will be lowered, as it is located on the left side of the pivot pin 36 and thus does not interfere with the ejection of the tire from the tire positioning frame portion. The frame portion 16 below the shoe 34 will usually be enclosed by cabinet structure and access thereto is provided through cover plate 50, FIG. 1.

The frame cabinet portion 18 houses and supports the lubricating liquid applying roller. This structure includes bearing members 52 and 54 mounted upon the frame cross beam 14. As will be appreciated from FIG. 2, the bearing member 52 and 54 are spaced relative to each other in the direction toward the frame portion 16 and linkage elements 56 and 58 extend from the bearings 52 and 54, respectively, pivotally connected thereto by pivot pins. In the disclosed embodiment, two linkage elements 58 are employed, as will be appreciated in FIGS. 1 and 4, while a single linkage 56 depends from the bearings 52. A support plate or element 60 is supported at the lower end of the linkages 56 and 58 by bearings 62 and 64 pivotally connected to the linkages 56 and 58, respectively. The lengths of the linkages 56 and 58 are equal, such that the support plate 60 is horizontally disposed, and together the upper frame crossbar 14, the support plate 60, and the linkages 56 and 58 define a parallelogram linkage which will result in the support plate 60 being horizontally disposed during all positions of the plate.

A pair of bearings 66 are mounted on the underside of the plate 60 for rotatably supporting the lubricating roller shaft 68 upon which the lubricating roller 70 is mounted in a cantilever manner. The lubricating roller 70 has a cross-sectional periphery which is circular and includes an outermost cylindrical portion 72, an outer conical portion 74 which converges toward the right, FIG. 2, and an inner conical portion 76 converging toward the portion 74 and intersecting therewith at the intersection line 78.

Rotation of the roller shaft 68 and roller 70 is produced by a rotary air motor 80 affixed to the underside of the support plate 60 and connected to the roller shaft through speed reduction transmission 82 and coupling 84. Appropriate flexible air conduits, not shown, communicate with the air motor 80 for supplying compressed air thereto when it is desired to rotate the roller 70.

A lubricating liquid pump 86 is also mounted to the underside of the plate 60 and the pump is drivingly connected to the air motor 80 and transmission 82 by coupling 88. The flexible hose 90 establishes communication between the lubricating liquid reservoir 92, mounted in the lower portion of the frame portion 18, and the inlet to pump 86. The reservoir 92, in the commercial embodiment, is capable of holding 70 gallons of a lubricating liquid, such as a vegetable oil soap.

The lubricating soap is applied to the roller by means of an open top tray 94 mounted upon the support plate 60 by a bracket 96. The tray 94 is of a length slightly longer than the roller 70 and is of a width to permit the lubricating roller to be received within the tray wherein only the upper portion of the roller extends thereabove, FIGS. 2 and 3. The tray includes a standpipe drain 98, FIG. 3, which includes an upper end disposed well above the tray bottom. The standpipe 98 is connected by a flexible hose 100 to the reservoir 92, FIG. 2. Lubricating soap is supplied to the tray 94 from the pump 86 by conduit 102, and the standpipe 98 permits a predetermined level of lubricating liquid to be maintained in the tray as determined by the height of the standpipe.

Figure 2:
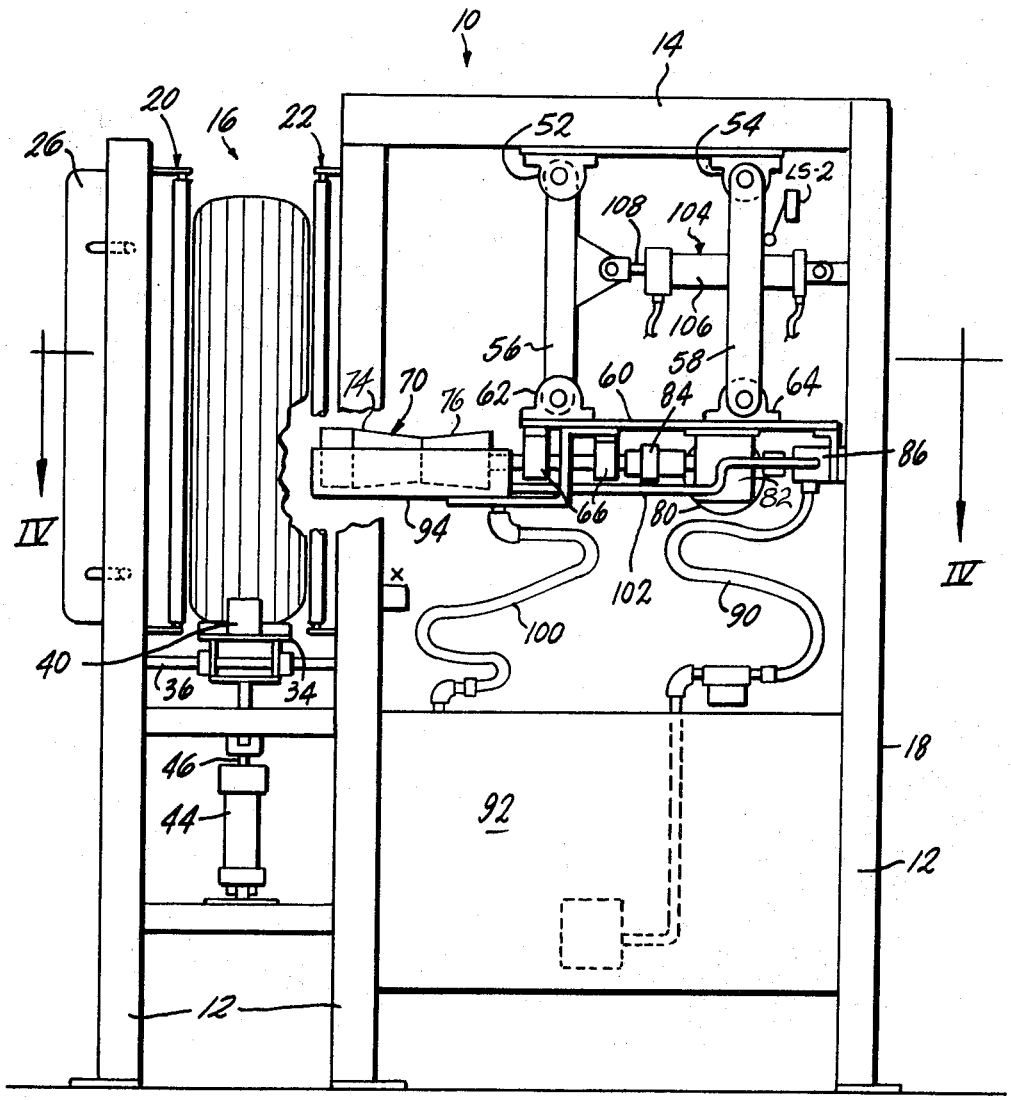
FIG. 2 is an elevational view of the tire lubrecation apparatus, partly in section, as taken along Section II—II of FIG. 1, and illustrating a tire in the tire positioning compartment, and the lubricating roller in the lowered inoperative position.

The lubricating roller 70 is shifted from the inactive position of FIG. 2 wherein the linkages 56 and 58 are substantially vertically disposed, to the raised position shown in FIG. 3, wherein the roller is received within the tire opening and lifts the tire from the shoe 34 during lubrication of the tire bead. The actuation of the linkage supporting the lubricating roller and support plate 60 is produced by an expansible motor 104 having a cylinder 106 pivotally connected to the frame 10, and a piston 108 pivotally connected to the linkage 56. The cylinder 106 is located intermediate the linkages 58 and upon the motor 104 being charged with compressed air to extend the piston 108 the linkage system and plate 60 will be shifted to the left, FIGS. 2 and 3, to the position shown in FIG. 3.

While the associated tire mounting structure with which the bead lubrication apparatus is employed does not constitute a part of the instant invention, that portion of the associated apparatus immediately adjacent the bead lubricator is illustrated in FIGS. 1 and 4, and the sequence of operation of the tire bead lubrication apparatus is best understood in conjunction with the operation of the loader receiving the soaped tire from the bead lubricator.

With reference to FIG. 1, the tire loader generally located at 110 consists of a frame member supporting a plurality of vertically disposed rollers 112 aligned with the roller sets 20 and 22 of the lubricator frame portion 16. Thus, upon the lubricated tire being ejected from the lubricator portion 16, it will be received between the sets of rollers 112 and maintained in the vertical position. The loader 110 also includes a pivoted concave loader shoe 114 mounted for pivotal movement about a horizontal pin 116. The shoe 114 is pivoted about its axis by an expansible chamber motor 118 including an extendable piston 120. Suitable air conduit means, not shown in FIG. 1, are associated with the motor 118.

The loader 110 includes a bridging framework supporting a pair of spaced horizontal rollers 122 disposed on opposite sides of the shoe 114 and located over the conveyor structure generally indicated at 124 upon which the wheels are conveyed to which the lubricated tires are to be mounted. The conveyed wheels are located upon pallets 126 which pass below the rollers 122 and movement of the conveyors and pallets are controlled in conjunction with the operation of the loader shoe 114 such that a lubricated tire may be transferred from the loader shoe to a pallet 126 containing a wheel, not shown, for mounting and inflation. Except for the control apparatus later described, the sequencing and operation of the conveyor 124 forms no part of the present invention.

Figure 5:
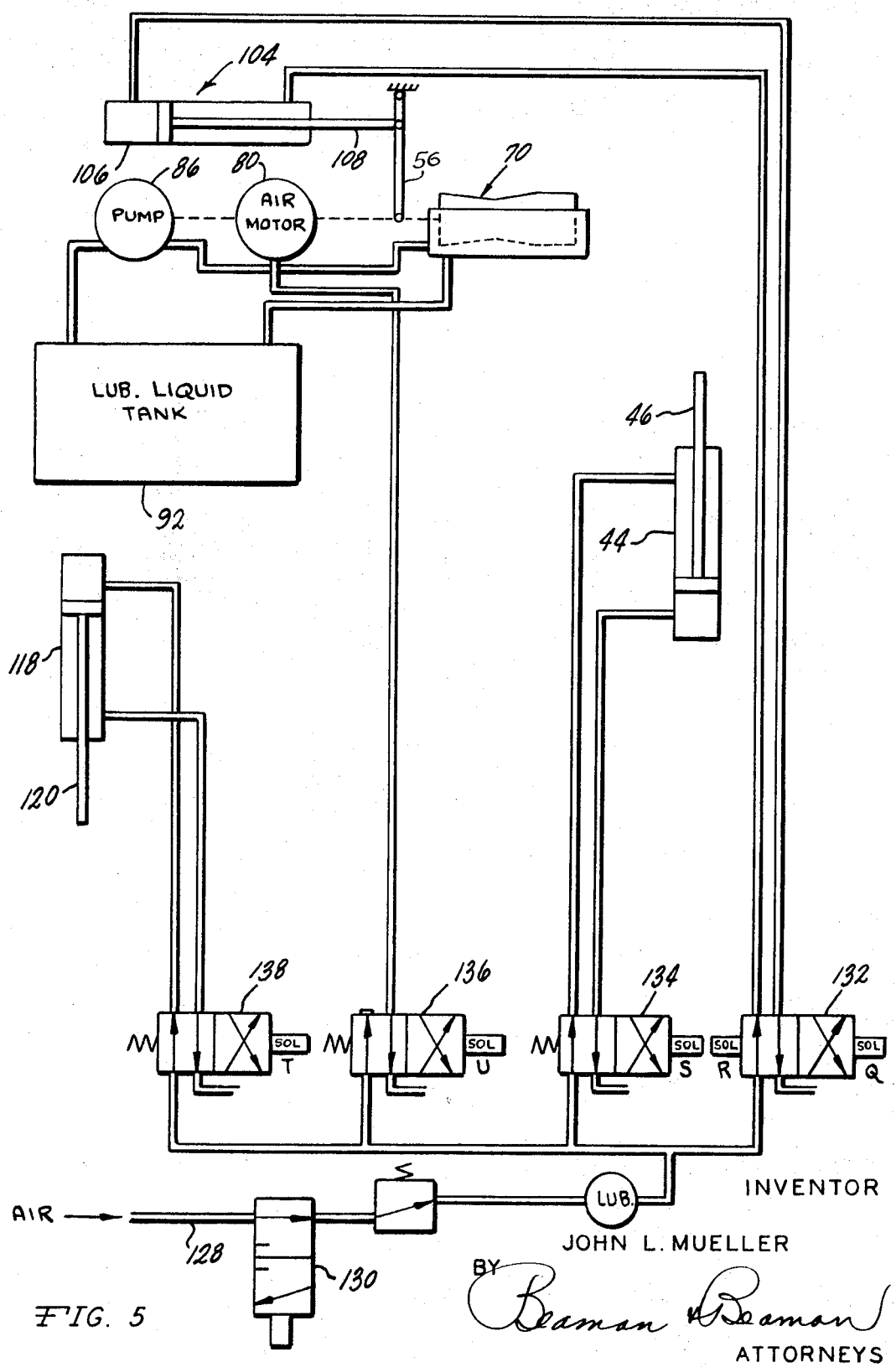
FIG. 5 is a diagram of the air control circuit and the lubricating liquid system used with the disclosed embodiment of the invention.

FIG. 5 illustrates the air circuit diagram employed with the invention and this circuit utilizes compressed air supplied through conduit 128 controlled by a valve 130. The expansible motor 104 is controlled by a four-way valve 132 operated by electric solonoids Q and R. The ejector shoe 34 operation is controlled by the four-way spring operated valve 134 operated under the influence of solonoid S. The air motor 80 which rotates the lubricating roller and lubricating liquid pump is controlled by the four-way solonoid valve 136 which is spring biased and controlled by the solonoid U. The loading shoe motor 118 is also controlled by a four-way valve 138 under the influence of solonoid T. All of the valves are supplied by compressed air through the supply conduit 128 and appropriate filters, lubricator, pressure regulators, etc. are incorporated into the pneumatic system as is well known in the art. Preferably, a muffler device is used with the air motor 80 in order to reduce the noise level.

The air motor 80 may be a Gast Motor Model 4AM-NRV-50, and the transmission 82 associated with the motor may be of the type known as a Boston Red UF115C having a 10-1 ratio. The pump 86 is preferably of the rotary gear type, and as will be later apparent, the pump only supplies lubricating liquid soap to the tray 94 when the lubricant is being applied to the tire.

A photoelectric cell X, FIG. 2, is located adjacent the tire positioning portion 16 to sense the presence of a tire within the tire positioning means. Further sensing means includes a limit switch LS-1 located on the loader frame 110 to sense the presence of a tire on the loader shoe 114 ready for being transferred to the wheel conveyor. Limit switch LS-2 is located on the frame portion 18 and senses the position of the linkage supporting the lubricating roller 70, FIG. 2. The position of the ejector shoe 34 is sensed by limit switch LS-3 disposed adjacent the limit switch shoe, FIG. 1. In the drawings the limit switches are schematically illustrated and may take any conventional form.

Figure 6:
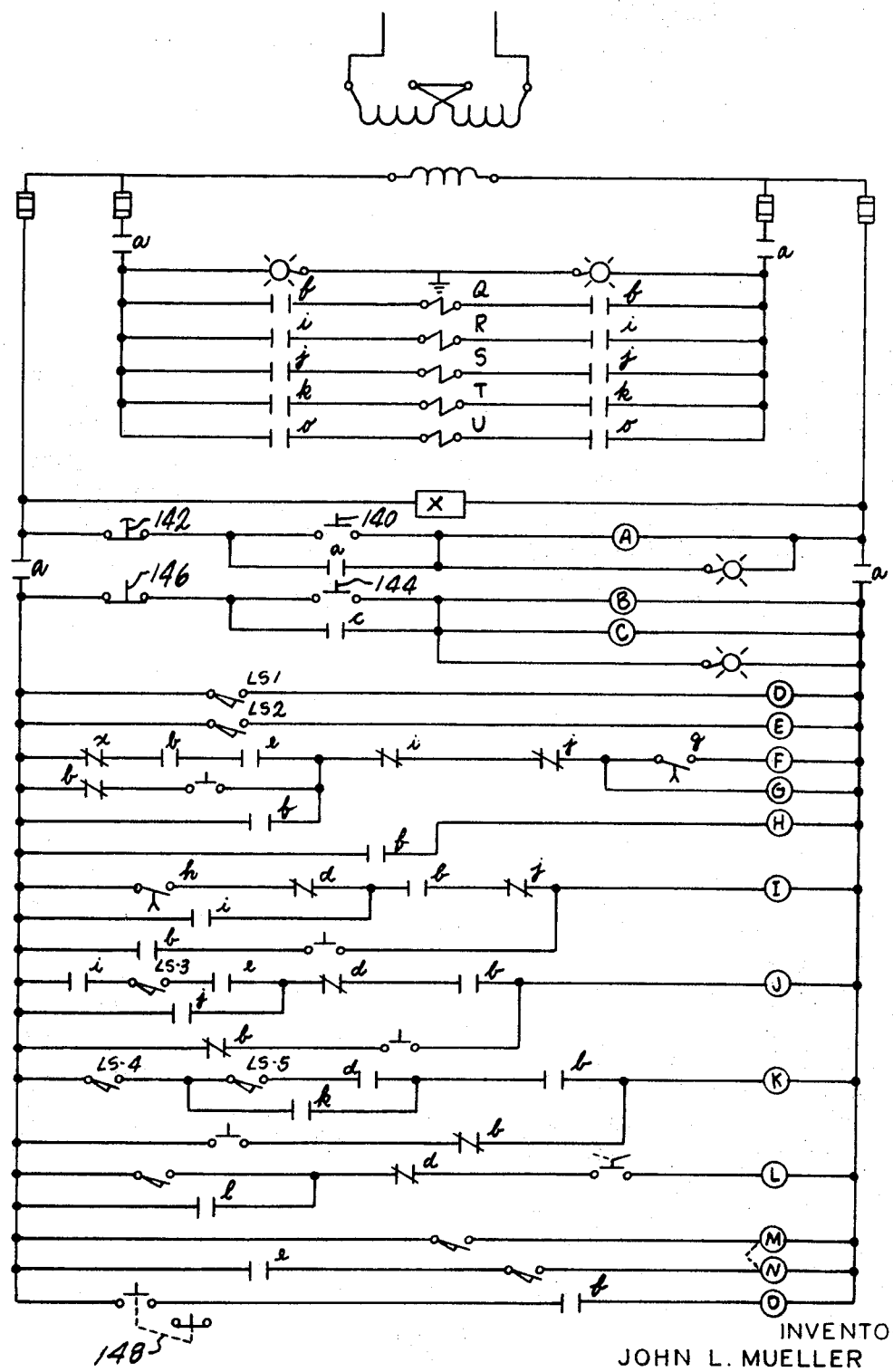
FIG. 6 is a diagram of the electrical circuit used with the invention.

The electric control circuit used with the tire bead lubricator of the invention is illustrated in FIG. 6 and relays designated by a capital letter include the relay contacts identified by the corresponding lower case letter which are normally open or closed, as indicated. The master relay A energizes the control circuit for the electrical components as well as the control circuits for the solonoids Q through U, and the master relay is turned "on" by switch 140, and "off" by master switch 142. Automatic operation is produced through the operation of relay B which is controlled by "on" switch 144 and "off" switch 146. Relay C is a part of the automatic control circuit.

The presence of a tire 42 on the loader shoe 114 adjacent the conveyor 124 is sensed by LS-1 which controls relay D, and limit switch LS-2 senses the position of the linkage supporting the lubricating roller 70 to control relay E indicating that the lubricating roller is in the down position shown in FIG. 2. Relay F is utilized to energize the circuit when the lubricating roller 70 is in the upper position of FIG. 3. The time delay relay G is for the purpose of producing the time delay prior to the lifting of the tire 42 by roller 70 after the tire is received within the tire positioning means as sensed by the photoelectric cell X. Time delay H controls the length of the duration of operation of the air motor and, hence, the lubricating cycle, which is approximately 4 to 6 seconds. The time delay H is also located in the control for the relay I which lowers the roller 70 through the actuation of the expansible air motor 104. Relay J senses the position of the ejector shoe 34 and includes limit switch LS-3 in its control circuit. Relay K is controlled by limit switches LS-4 and LS-5, which are associated with the conveyor 124 and the loader. When a wheel pallet 126 is in a position to receive a soaped tire, the limit switches associated with relay K operate to energize the solonoid T and pivot the loader shoe 114 in a counterclockwise direction, FIG. 1, to transfer the tire to a wheel pallet 126.

Relays L, M and N are utilized in the innerlock circuit with the conveyor movement, and as they form no part of the instant invention are not further described.

Energization of the air motor 80 is controlled by relay O, and the air motor is only energized when the lubricating roller is in the elevated position as sensed by limit switch LS-2.

SEQUENCE OF OPERATION

In the initial condition the lubricating roller 70 will be in the position shown in FIG. 2 wherein the linkages 56 and 58 are vertically disposed and roller 70 and tray 94 are withdrawn from between the roller sets 20 and 22. As will be apparent in FIG. 4, at this condition the outer end of the tray and roller will be located within the opening 30 defined by the roller set 22. The tire ejector shoe 34 will be in the down condition shown in FIG. 1, as will the tire loader shoe 114, and no tire would be located within the tire positioning frame portion 16.

The lubricating roller switch 148 is closed and the master "on" switch 140 and the automatic "on" switch 144 are also closed. As no tire 42 is located between the roller sets 20 and 22, as sensed by the photoelectric cell X, and as the ejector shoe 34 is in the down position as sensed by LS-3, and as the roller 70 and linkage is in the down position as sensed by LS-2, a tire is allowed to enter the tire positioning frame portion 16. As previously mentioned, the tire may be inserted between the roller sets from above, and the conveyor structure associated with the tire supply means is not illustrated.

Upon the tire being received on the ejector shoe 34 its presence will be sensed by the photoelectric cell X. After a duration of from 2 to 4 seconds, as is determined by time delay switch G, relay F will be energized which will energize solonoid Q to shift valve 132 such as to extend the piston 108 and move the roller 70 in an axial direction toward the left, FIG. 2 so that the roller and soap tray enter the central opening of the tire located on the ejector shoe. As extension of the piston 108 continues the linkage support of the roller 70 will also produce a vertical lifting of the roller which causes the roller periphery to engage the beads defining the tire opening and lift the roller from the ejector shoe 34. This movement of the linkage support for the roller is sensed by LS-2 and starts the operation of the air motor 80 through the energization of solonoid U.

As the lubricating roller 70 is shifted through the tire positioning roller openings 22 and 20 it will engage the tire, but axial movement of the tire is prevented by the rollers 24 of the set 20 causing the tire to slide across the roller 70 until the tire beads 43 are supported upon the conical roller portions 74 and 76 as shown in FIG. 3. The engagement of the tire beads on the conical surfaces of the roller 70 tends to center the tire 42 within the tire retaining rollers 24 and assures a uniform application of lubricating soap to the beads.

The length of the duration of operation of the air motor 80 and the application of lubricating soap to the tire beads is determined by time delay relay H, which may be from 4 to 6 seconds, depending upon the rate of rotation of the roller 70, and at the end of this time period the air motor is stopped by the operation of the solonoid U. It will therefore be appreciated that as the pump 86 is only operating as long as the air motor 80 is energized that the pumping of lubricating liquid soap from the reservoir 92 into the tray 94 occurs during the time that the lubricating liquid is being applied to the tire. Thus, even though the lubricating liquid pump may be supplying soap to the tray at a rate greater than is being used, the standpipe drain 98 will insure that the proper amount of soap is within the tray at the beginning of each cycle, and will prevent tray overflow.

At the end of the lubrication cycle solonoid R is energized to lower the roller 70 to the position of FIG. 2 and the lubrication sequence has been completed.

If LS-1 indicates that there is no tire presently located on the loader shoe 114, the tire ejector motor 44 is energized through the control of solonoid S and the shifting of the valve 134. This actuation causes an extension of the piston 46 pivoting the shoe 34 in a counterclockwise direction, FIG. 1, causing the lubricated tire to roll from the shoe 34 to the loader shoe 114 and thereby actuating LS-1 to indicate the presence of a tire on the loader shoe. Operation of LS-1 deenergizes solonoid S to shift valve 134 to lower the ejector shoe 34, and as soon as the ejector shoe returns to its initial position as shown in FIG. 1, another tire may be allowed into the tire positioning means even while a previously lubricated tire is located on the loader shoe 114.

Operation of the movement of the loader shoe 114 through the sequencing of the relay K and the solonoid T and valve 138 is in accord with conveyor limit switches LS-4 and LS-5 which sense the presence of a wheel pallet 126 intermediate the rollers 122, and as this sequencing is not directly applicable to the lubrication cycle, further description is not given. It will be understood that operation of the ejector shoe 34 to transfer a lubricated tire from the lubrication apparatus to the loader shoe 114 cannot occur as long as LS-1 senses the presence of a tire in the loader.

As the entire weight of the tire rests upon the loader during the lubrication of the beads, an effective transfer of the lubricating liquid soap from the roller periphery to the tire beads takes place. As the process is a "roll coating" a minimum of lubricating liquid is applied to the beads, and many of the problems heretofore encountered with spray type lubricating equipment are avoided.

It is appreciated that various modifications to the inventive concept may be apparent to those skilled in the art without departing from the spirit and scope of the invention.

I claim:

1. Apparatus for lubricating the beads of pneumatic tires prior to mounting the tires on wheels comprising, in combination, tire supporting means for supporting an unmounted tire in a substantially vertical manner, a lubricating liquid applying roller mounted adjacent said tire supporting means, drive means connected to said roller rotating said roller about a substantially horizontal axis, roller support means supporting said roller for axial movement in a horizontal direction and for movement in the vertical direction transverse to the roller axis, lubricating liquid supply means supplying lubricating liquid to said roller, and control means controlling operation of said roller support means for inserting said roller within the central opening of a tire supported upon said tire supporting means and lifting the tire therefrom whereby the tire is supported by said roller upon its beads and lubricating liquid is applied thereto by said roller as said roller rotates the tire.

2. Apparatus for lubricating the beads of pneumatic tires as in claim 1 wherein said tire supporting means includes a tire supporting shoe pivotal between tire supporting and tire ejecting positions and shoe actuating means connected to said shoe.

3. Apparatus for lubricating the beads of pneumatic tires as in claim 1 wherein said roller includes a peripheral surface having first and second axially extending portions, said surface portions each being of a generally conical configuration converging toward each other defining a tire self-centering configuration on said roller periphery.

4. Apparatus for lubricating the beads of pneumatic tires as in claim 1 wherein said roller support means includes a support member rotatably mounting said roller, a frame including a portion disposed above said support member, and a pair of links pivotally attached to said frame portion and said support member movably mounting said support member on said frame member for both horizontal and vertical movement.

5. Apparatus for lubricating the beads of pneumatic tires as in claim 4 wherein said links are spaced and parallel with respect to each other and define a parallelogram linkage support for said support member and lubricating liquid applying roller.

6. Apparatus for lubricating the beads of pneumatic tires as in claim 4 wherein said drive means connected to said roller comprises a motor mounted on said support member drivingly connected to said roller for rotating said roller.

7. Apparatus for lubricating the beads of pneumatic tires as in claim 4 wherein said control means includes an expansible motor interposed between said frame and said links adapted to pivot said links and support member between selective positions to raise and lower said roller relative to said tire supporting means.

8. Apparatus for lubricating the beads of pneumatic tires prior to mounting the tires on wheels comprising, in combination, a frame, tire positioning means defined on said frame for positioning an unmounted tire in a substantially vertical manner, said tire supporting means including tire side wall engaging means limiting tire axial movement within said positioning means and permitting tire vertical movement, a lubricating liquid applying roller having a periphery and a substantially horizontal axis of rotation, roller support means mounted on said frame supporting said roller for both axial and vertical movement adjacent said tire positioning means, a roller support means actuator connected to said roller support means for moving said roller in its axial and the vertical directions whereby said roller may be axially inserted into the opening of a tire located within said tire positioning means and vertically raised to support a tire upon its beads upon said roller, drive means connected to said roller for rotating said roller about its axis, lubricating liquid supply means supplying a lubricating liquid to said roller periphery and control means controlling operation of said actuator and the position of said roller.

9. In an apparatus for lubricating the beads of pneumatic tires as in claim 8 wherein said roller support means comprises a parallelogram linkage pivotally mounted upon said frame and said actuator is operatively interposed between said frame and said linkage.

10. In an apparatus for lubricating the beads of pneumatic tires as in claim 9 wherein said actuator comprises an expansible chamber motor having a cylinder and a piston axially movable therein, first pivot means pivotally connecting said cylinder to said frame and second pivot means pivotally connecting said piston to said linkage.

11. In an apparatus for lubricating the beads of pneumatic tires as in claim 9 wherein said lubricating liquid supply means comprises a tray mounted on said roller support means, said roller periphery being partially immersed in said tray whereby the upper portion of said roller extends from and above said tray and conduit means supplying lubricating liquid to said tray.

12. In an apparatus for lubricating the beads of pneumatic tires as in claim 11, a lubricating liquid reservoir, a pump communicating with said reservoir and said conduit means for pumping lubricating liquid from said reservoir to said tray, and a standpipe drain located in said tray communicating with said reservoir to maintain a predetermined level of lubricating liquid within said tray.

13. In an apparatus for lubricating the beads of pneumatic tires as in claim 8 wherein said tire positioning means includes a pair of rows of spaced, vertically disposed rollers rotatably mounted on said frame, said rows being substantially parallel to each other and spaced apart a distance slightly greater than the width of the tire to be positioned.

* * * * *